June 7, 1960 H. B. COLE 2,939,362
OPTICAL IMAGE TRANSFER DEVICES
Filed Feb. 16, 1959 2 Sheets-Sheet 2

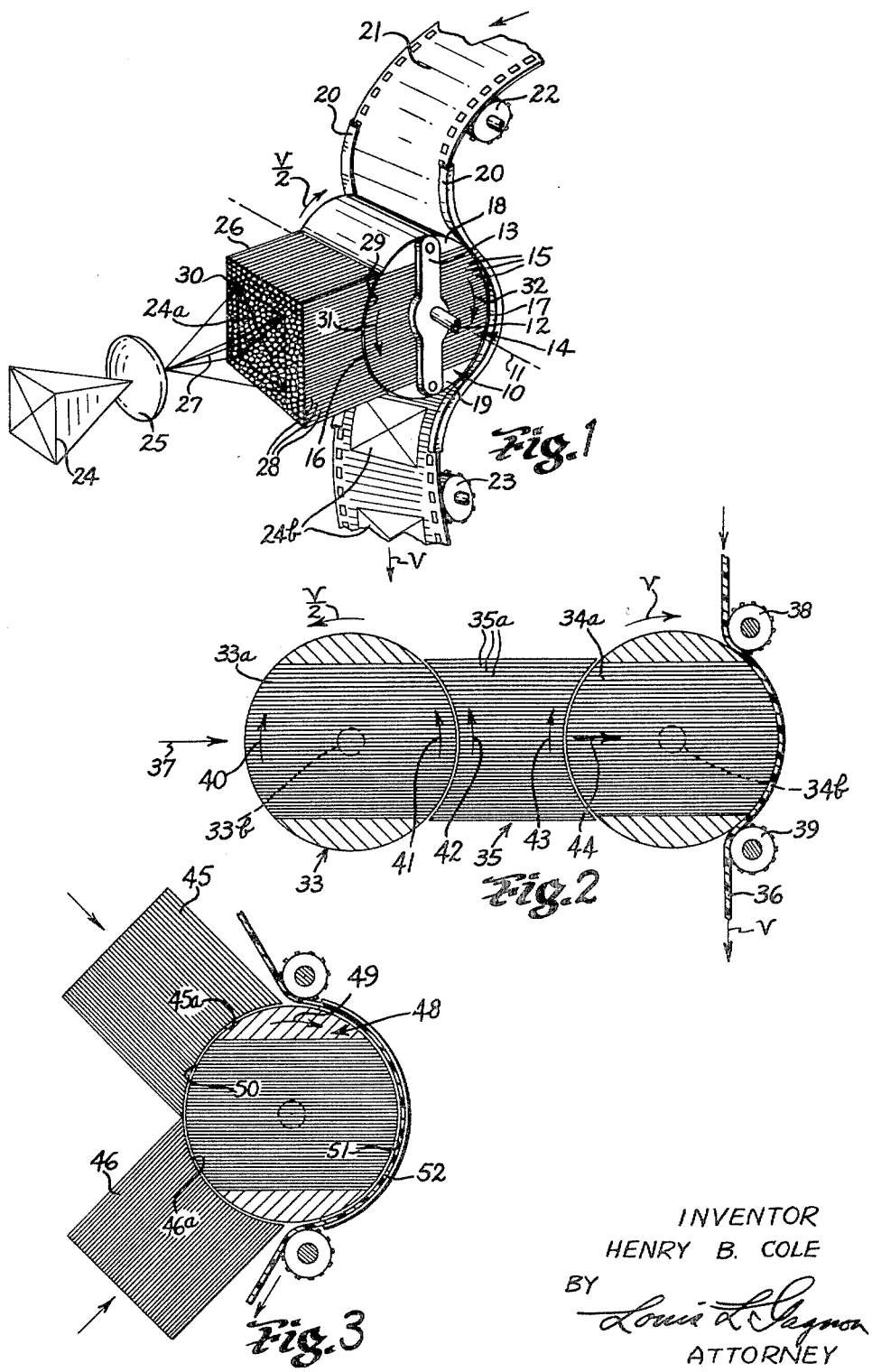

INVENTOR
HENRY B. COLE
BY
Louis L. Gagnon
ATTORNEY

United States Patent Office
2,939,362
Patented June 7, 1960

2,939,362

OPTICAL IMAGE TRANSFER DEVICES

Henry B. Cole, East Woodstock, Conn., assignor to American Optical Company, Southbridge, Mass., a voluntary association of Massachusetts Filed Feb. 16, 1959, Ser. No. 793,378

10 Claims. (Cl. 88—16.8)

This invention relates to optical image transfer devices and more particularly to fiber optical means for transferring images from one location to another and for simultaneously introducing motion to the images being transferred thereby wherein said means embodies a movable assembly of light-conducting fibers.

In the motion-picture industry, high speed photography is often used to create special effects wherein a film which has been exposed while traveling at a relatively high speed is projected at a slower speed to produce slow-motion movies. Scientifically, slow-motion movies are used to great advantage in the study of fast-moving objects and it is often required that these objects be photographed with high-speed cameras wherein the film is fed past the camera objective at an exceptionally high speed.

In high-speed motion-picture cameras or projectors, the frame repetition rate might be such that the film would become torn or otherwise damaged from forces produced thereon by conventional claw-type or other intermittently operated film-advancing mechanisms. The forces which are produced on films by intermittently operated film-advancing mechanisms increase as the square of the frame repetition rate and, consequently, become excessive when cameras or projectors are operated at speeds such as, for example, 100 or more frames per second and oftentimes cause a tearing of the film. Moreover, with intermittently operated film-advancing mechanisms, it is necessary to provide intricate and expensive shutter arrangements which operate in synchronism with the film-advancing mechanism to prevent light from passing between the film and objective of the camera or projector during the movement of the film from one frame to another.

Motion-picture cameras and projectors in which the film is moved continuously from one frame to the next do not require the shutter arrangements common to intermittently operated film-advancing mechanisms but do, however, require that an image received by the film (in cameras) be moved in the direction of film movement and at a rate equalling the rate of movement of the film so as to avoid relative movement between the film and image during the time the film is exposed to said image. Heretofore, various relatively complicated and expensive optical devices in the form of rotary prisms and/or mirrors have been used to introduce movement to the images received by the film in cameras or projected from the film in projectors. While the prior art devices have met with limited degrees of success, it has not been possible heretofore to produce an image movement which is constant and precisely synchronized at all times with the film speed. Thus, in addition to being expensive and relatively complicated to manufacture, optical devices of the above character inherently produce what is known as "slip" in the system with the result that a smearing of the projected image occurs. Slip results from motion taking place between an image and film during the period of time of exposure of said film to the image or from portions of an image moving at a different rate than other portions thereof relative to a film which is moved at a constant rate.

The present invention provides means for obviating the need for complicated shutter and intermittent film-drive mechanisms in motion-picture cameras and projectors or the like, and further provides simple and economical means which permits cameras or projectors to be operated at high speeds without detriment to the picture image quality or damage to the film.

It will become apparent as this description progresses that the invention is not limited in application to motion-picture equipment but may be used to equal advantage in other forms of apparatus wherein it is desired to impart movement to images being optically transferred from one location to another.

A principal object of the invention is to provide simple, economical, and efficient fiber optical means for transferring optical images from one location to another while simultaneously imparting a desired movement to said images during said transfer.

Another object is to provide a device of the above character embodying at least one rotatable bundle of intimately grouped light-conducting fibers by means of which movement may be imparted to images transferred through said bundle of fibers when said bundle is rotated.

A further object is to provide an image transfer device of the above character which is more particularly adaptable to motion-picture cameras or projectors of the type wherein the film is moved continuously during the operation of said cameras or projectors.

A still further object is to provide highly efficient and extremely simple optical image transfer and image movement means which, being formed of light-conducting fibers, will accurately transfer optical images from one location to another while providing good image quality and resolution without appreciable loss of light, spherical or chromatic aberrations, distortion or other conditions common to conventional optical image transfer systems.

Other objects and advantages of the invention will become apparent from the following description when taken in conjunction with the accompanying drawings in which:

Fig. 1 is a perspective view diagrammatically illustrating one form of the device of the invention;

Figs. 2, 3, and 4 are longitudinal cross-sectional views each diagrammatically illustrating a modified form of the device of the invention;

Figure 4:
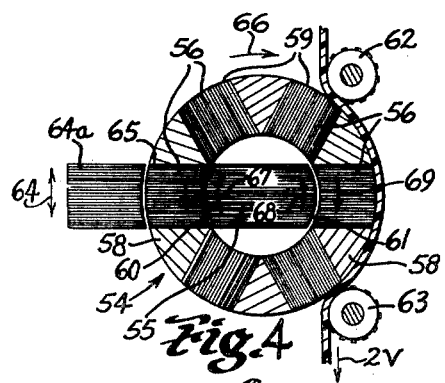

In referring to the drawings, it will be seen that one form of the device of the invention which is illustrated diagrammatically in Fig. 1 embodies a cylinder 10 which is rotatable about its axis 11. A spindle 12 is fixed to the cylinder 10 by means of a bracket 13 to support the cylinder and to offer means by which the cylinder 10 may be rotated about its axis 11. The major portion of the cylinder 10 comprises a rectangularly-shaped bundle 14 of intimately grouped light-conducting fibers 15 each of which has its longitudinal axis extending through the cylinder 10 in a direction normal to the direction of the axis 11 of the cylinder.

The fibers 15 are preferably of the clad or light-insulated type which each embody a core part of light-conducting material such as glass or plastic or the like, having a relatively high index of refraction and a thin outer coating or cladding of a similar material having a relatively low index of refraction. For example, the core could have an index of refraction of approximately 1.69 and the coating an index of refraction of approximately 1.52. The fibers 15 may be of any cross-sectional shape and/or size desired and are intimately bundled and fused, cemented or otherwise secured together in side-by-side parallel relation with each other with the fibers at the opposite ends of the bundle having the same geometrical pattern. It is pointed out that the image-resolving power of the fiber bundle 14 will be dependent upon the cross-sectional size of the fibers 15 which make up the bundle 14. That is, bundles formed of small fibers will produce images of better resolution than will bundles formed of large fibers. However, in the fabrication of the fiber bundle 14, the fibers 15 become increasingly more difficult to handle as their cross-sectional sizes decrease and, for this reason, the fibers 15 used to form the bundle 14 are selected to be of a size only small enough to provide the bundle 14 with a desired degree of image-resolving power.

The opposite ends of the fiber bundle 14 are formed with identically cylindrically curved convex surfaces 16 and 17 which are concentric with each other and equally radially spaced from the axis 11 of the cylinder 10. The exposed ends of the fibers 15 at the faces 16 and 17 are optically finished to render each of the fibers receptive to light whereby light entering one of their ends within the light-acceptance angle of the fibers will exit freely through the opposite ends thereof.

In addition to the fiber bundle 14, the cylinder 10 embodies a pair of blocks 18 and 19 which are attached to the fiber bundle 14. The blocks 18 and 19 are each provided with cylindrically curved outer surfaces matching the curvatures of the ends of the fiber bundle 14 and are placed, one at each side thereof (as shown) to fill out the cross-sectional area of the cylinder 10 and together with the bundle 14, provide the cylinder 10 with a continuous outer peripheral side surface. The blocks 18 and 19 may be formed of any suitable material such as plastic, metal or wood and are preferably cemented or otherwise secured to the respective sides of the fiber bundle 14. It is pointed out that the blocks 18 and 19 function to provide means upon which the spindle-supporting bracket 12 may be mounted. By forming the blocks 18 and 19 of a material which is substantially equal in weight per volume to that of the fiber bundle, the cylinder 10 will rotate smoothly and without vibration about its axis 11. While the fiber bundle 14 may be used without the blocks 18 and 19 to perform the image transfer feature of the invention, it will become apparent hereinafter that a constant and smooth or vibrationless rotation of the bundle 14 will produce the best results.

While the cylinder 10 arrangement may be used to transfer images from a continuously moving film through an optical projection system as in motion-picture projectors, the same cylinder arrangement may be used to receive images from a camera objective and transfer said images to a continuously moving film for purposes of exposing the film. This latter arrangement is diagrammatically shown in Fig. 1 to illustrate the function of the cylinder 10.

At one side of the cylinder 10 there is placed means in the form of a pair of film-guide channels 20 adapted to guide a motion-picture film or the like 21 past the cylinder 10 and in close proximity to the side surface of the cylinder 10. The channels 20 are provided with a curvature between their opposite ends which is concentric with the curvature of the side surface of the cylinder 10 so as to cause all parts of the film 21 when passed through the guide channels 20 to be substantially equally spaced from the cylinder 10 throughout the curved section of the channels 20. The film 21, having the usual perforated side edge portions, is fed through the channels 20 by sprockets 22 and 23 and, for purposes of illustration, the film 21 will be described hereinafter as being fed downwardly, wherein the sprocket 23 will function as the drive means to draw the film through the channels 20 and the sprocket 22 will function to guide and feed the film 21 into the channels 20. At the side of the cylinder 10 opposite to the channels 20, there is provided an optical image-forming and projecting system for projecting images of an object such as illustrated by 24 onto the fiber bundle 14 of the cylinder 10 wherein said images will be transferred by the fiber bundle to the film 21 as will be described in detail hereinafter. The optical image-forming and projecting system embodies a conventional camera objective 25 and light-collimating means in the form of a fiber optical element 26. The objective 25 and element 26 are placed in axial alignment with each other along an optical axis 27 which intersects the axis 11 of the cylinder 10 at right angles thereto and passes substantially centrally through the width of the fiber bundle 14 and film 21.

The element 26 embodies a great number of light-conducting fibers 28 which are similar to the fibers 15 described hereinabove and the fibers 28 are intimately bundled and secured together in side-by-side parallel relation with each other with the fibers at the opposite ends of the bundle having the same geometrical pattern. The element 26, being immovable, is provided with a face 29 which is cylindrically curved to match the curvature of the end surfaces of the fiber bundle 14 thereby permitting the face 29 of the element 26 to be placed in close adjacent relation with the cylinder 10 as shown. Thus, it can be seen that both the element 26 and the film 21 are placed in close proximity to the cylinder 10, one at each side thereof, while permitting the cylinder 10 to be freely rotated with a minimum of clearance between the film 21 and element 26. The element 26 is further provided with an image-receiving face 30 which is spaced from the objective 25 a distance equal to the focal length of the objective 25. While the face 30 has been shown as being a flat surface, it is to be understood that the face 30 may be provided with a concave curved shape matching that of the field curvature inherently produced by the objective 25 so as to cause all parts of an image 24a of the object 24 to be received precisely in focus at the plane of the face 30. In this manner, the element 26 will function as a field-flattener as well as means to transfer images to the fiber bundle 14. Field-flatteners and image-transfer devices similar to the element 26 have been disclosed in detail in an application for patent Serial No. 739,535, filed June 3, 1958, in the name of John W. Hicks, Jr.

It is pointed out that while the element 26 provides simple, inexpensive and highly efficient means for accurately transferring the image 24a to the face 16 of the fiber bundle 14, it is possible to replace the element 26 with a more complicated and expensive system of lenses or the like.

With the fiber bundle 14 in a position such as shown in Fig. 1, an image 24a of an object 24 will be formed at the face 30 of element 26 by the objective 25 whereupon the image 24a will be transferred through the fibers of the element 26 to its face 29. At the face 29 of the element 26, the image will be reformed to the cylindrical shape of the face 29 which shape matches the shape of the face 16 of the fiber bundle 14. The face 16 of the fiber bundle 14, being receptive to light, as described above, will receive the image in substantially perfect focus and the image will, in turn, be transferred through the fibers 15 to the face 17 of the fiber bundle 14. The face 17 will then cause the image to be shaped to an equal and opposite cylindrical curvature than that produced by the face 29 of the element 26. In this manner, the image shape will conform to the curvature of the film 21 and all parts of the image will be received thereby in substantially perfect focus.

When the motion-picture camera system of Fig. 1 is in operation, the sprocket 23 is driven at a constant rate by conventional camera drive means (not shown) to advance the film through the guide channels 20 at a predetermined constant velocity V in the direction indicated by the arrow V. In order to expose a constantly moving film such as 21 without causing a smearing of the image to be produced thereon, it is necessary to move the image being projected onto the film in the same direction and at a velocity equal to that of the film so as to produce no relative movement between the image and the film during the time of exposure of the complete image on the film. This is accomplished in the device of Fig. 1 by rotating the cylinder 10 about its axis 11 at a speed such as to cause the outer peripheral side surface of the cylinder 10 to travel at a velocity of ½ the velocity V of the film 21 as indicated by the arrow designated as V/2. Conventional constant speed drive means (not shown) is connected to the spindle 12 to rotate the cylinder.

To fully understand the reason for the different velocities at which the film 21 and outer peripheral side surface of the cylinder 10 must be rotated, it is pointed out that an image 24a, which ultimately will expose one frame 24b of the film 21, will be stationary when emitted from the face 29 of the element 26. However, when the image is received by the face 16 of the fiber bundle 14 (which face 16 is moving past the element 26 at a velocity of V/2 in the direction of the arrows V/2 motion will be introduced in the image passing through the fibers 15 in the direction of arrow 31 (downwardly in the fiber bundle 14) and this motion will be at a velocity V/2. Therefore, when the image reaches the face 17 of the fiber bundle 14, it will continue to be traveling downwardly off the bundle in the direction indicated by arrow 32 at a velocity of V/2. At the same time, the outer peripheral side surface of the cylinder 10 is traveling at a velocity of V/2, in the same direction as arrow 32, so that as the image exits from the face 17 at a downward velocity of V/2 in the fiber bundle 14, the velocity of V/2 of the face 17 itself is added to the velocity of the image passing through the fiber bundle to cause the image to leave the face 17 at a velocity of V. Therefore, with the film moving in the same direction as the image and at a velocity V, no relative motion takes place between the image and the film during the time the image is exposed to the film.

It can be seen that for each 180° rotation of the cylinder 10, the faces 16 and 17 of the fiber bundle 14 reverse themselves and as each face passes the element 26 an image frame 24b is produced upon the film 21 so that for each 360° rotation of the cylinder 10, two frames 24b are produced upon the film 21 which are spaced from each other a distance in accordance with the circumferential distance from one edge of a block 18 or 19 to its opposite edge and further in accordance with the light-acceptance angle of the fibers 15 which is a factor of the differences in index of refraction of the high index core parts of the fibers and the low index claddings of the fibers. Where $u$=the light-acceptance angle of the fibers, $N_1$=the index of refraction of the core part of the fibers and $N_2$=the index of refraction of the cladding part of the fibers, $\sin u = \sqrt{N_1^2 - N_2^2}$. Thus a bundle 14 of fibers having larger light-acceptance angles will produce smaller spaces between frames on the film 21 than will a bundle 14 of fibers having smaller light-acceptance angles.

With the device of Fig. 1, improved means is provided for exposing continuously moving motion-picture film and no substantial forces are exerted on the film by its drive mechanism (sprockets 22 and 23) once the film is traveling at its intended velocity. In order to eliminate damaging starting forces, the film may be gradually increased in velocity from a condition of rest to a desired operating velocity. At the completion of the film exposure, the portion of the film exposed during the starting period would be cut from the film or alternatively a shutter may be placed in the system to prevent exposure of the film during its starting period. Furthermore, due to the fact that all parts of the images which form each frame on the film 21 are in substantially perfect focus when incident upon the film and are traveling at the same rate and in the same direction as the film, no smearing of the picture frames results and "slip" is non-existent in the system of Fig. 1. In addition, all intricate and expensive shutter mechanisms which are required in conventional intermittently operated film drive arrangements are eliminated.

It is to be understood that the device of Fig. 1 may be operated as a projector, if desired, wherein previously exposed and processed film is fed through the guide channels 20. In such a case, by projecting light through the film and placing a viewing screen at the location of the image 24 (Fig. 1), the film images will pass through the fiber bundle 14, element 26 and objective 25 in reverse order to the above-described procedure when the device is operated as described above, and the film images or frames will be successively displayed upon the screen.

It is also pointed out that the device of Fig. 1 may be used for film-printing wherein it is the practice to transfer picture information from one film to another. In such instances, the film carrying the picture information would be fed through the plane of the image 24 (Fig. 1) and a film having light-sensitive means thereon to receive said information would be fed through the guide channels 20 with the light being projected through the film carrying the picture information and through the system onto the film having the light-sensitive means thereon.

In Fig. 2, there is shown diagrammatically a modification of the device of Fig. 1 wherein two rotatable fiber optical image-transfer cylinders 33 and 34 and an intermediate stationary fiber optical image-transfer bundle 35 are used to transfer optical images to a continuously moving film 36. The cylinders 33 and 34 are equal in size and are identical in construction to the cylinder 10 of Fig. 1 and embody fiber bundles 33a and 34a respectively which are disposed therein with the longitudinal axes of their light-conducting fibers directed at right angles to the respective axes of rotation 33b and 34b of the cylinders.

The fiber transfer bundle 35 is made up of many light-conducting fibers 35a in intimately connected side-by-side relation with each other and is similar to the fiber optical element 26 of Fig. 1. The transfer bundle 35, however, is provided with a cylindrically curved face portion at each end thereof so as to fit between the rotatable cylinders 33 and 34, as illustrated, while allowing only a minimum of clearance between the curved faces of the transfer bundle 35 and the respective adjacent side surfaces of the cylinders 33 and 34. Images which are to be directed onto the film 36 are passed in the direction of the arrow 37, by suitable optical image-forming means, such as the objective 25 and element 26 of Fig. 1, into the fiber bundle 33a of the cylinder 33 whereupon they are next transferred into the fiber bundle 34a of the cylinder 34 by the transfer bundle 35 and then to the film 36 from the fiber bundle 34a.

It is particularly pointed out that in the device of Fig. 2 the film 36 is in direct contact with the side surface of the cylinder 34 rather than being slightly spaced therefrom as in Fig. 1 due to the fact that the cylinder 34 is rotated, when the system of Fig. 2 is in operation, at a rate which is such as to cause its outer peripheral side surface to travel at a velocity equal to that of the film 36 and in the same direction as will be presently described in greater detail. This feature obviates the need for film-guide channels such as shown in Fig. 1 and direct exposure of the film 36 by light passing through the cylinder 34 is accomplished. Film-feed sprockets 38 and 39 are provided to guide the film accurately over the cylinder 34.

In operation, the device of Fig. 2 functions as follows:

With the film 36 traveling at a velocity V in the direction indicated by the arrow V and the cylinder 34 being rotated at a rate such as to cause its peripheral outer side surface to also travel at a velocity V in the direction of the arrow, the cylinder 33 is rotated at a rate and in a direction opposite to that of the cylinder 34 such as to cause its outer peripheral side surface to travel at a velocity of ½ that of the cylinder 34 or $V/2$ as indicated by the arrow $V/2$.

In tracing the projection of an image through the system of Fig. 2, it will be seen that a stationary image entering the fiber bundle 33a of the cylinder 31 from the direction indicated by the arrow 37 will be set in motion through the fibers of the bundle 33a by the rotation of the cylinder 33 and the image will effectively move upwardly through the fibers thereof in the direction of arrow 40 at a velocity of $V/2$. Upon leaving the fiber bundle 33a, it will be traveling upwardly through the fibers thereof, as indicated by arrow 41, still at a velocity of $V/2$ which when combined additively with the velocity of the outer surface of the cylinder 33 which is traveling at a velocity $V/2$ in the same direction will cause the image to enter the fiber transfer bundle 35 at a velocity of V and moving in the direction of the arrow 42. The image will be transferred through the bundle 35 and exit therefrom at the same velocity, V, and in the same direction, as indicated by the arrow 43. The outer peripheral surface of the cylinder 34 which is traveling at a velocity V in the same direction as the image which exits from the transfer bundle will counteract the motion of the image exiting from the transfer bundle whereby no up or down motion of the image passing through the fiber bundle 34a itself will take place and the image, being effectively stationary in the bundle 34a will pass therethrough in the direction of arrow 44. However, upon exiting from the fiber bundle 34a, whose outer side surface is traveling at a velocity V, the image will be moved downwardly in the direction of the film feed at a velocity V which matches the velocity of the film. Thus, no relative motion between the image reaching the film and the film itself will take place and the film will be exposed with no picture smearing or slip in the system. It will be noted that for each 360° rotation of the cylinder 33, two picture frames will be produced on the film 36.

As in the case of the device of Fig. 1, the Fig. 2 arrangement may be used as a projector or film printer or for other purposes by projecting light through the film wherein an image on the film will travel through the system in reverse order to the above-described travel of the image 37.

It will be noted that in the system of Fig. 1, a rather large unexposed space is provided between the frames 42b on the film 21. This also holds true in the system of Fig. 2. These spacings may be used to advantage by modifying the systems of Fig. 1 and/or Fig. 2, as shown in Fig. 3, wherein means is provided to alternately and successively produce first one and then a second image on the film with no space between image frames produced on the film.

The system which is diagrammatically illustrated in Fig. 3 is identical in construction and operation to the system of Fig. 1 with the exception that means in the form of two fiber optical bundles 46 and 47 is provided for directing two images into the rotating fiber optical cylinder 48. The fiber optical bundles 45 and 46 are both identical in construction and function to the element 26 of Fig. 1 and, as stated hereinabove with reference to the element 26 of Fig. 1, they may, if desired, be replaced by conventional lens systems or the like.

With the cylinder 48 rotating in the direction of the arrow 49, one of its image-receiving faces, for example, face 50, will first pass by the image-emitting face 46a of the fiber bundle 46 to transfer an image from the bundle 46 to the film 52. Immediately upon passing by the bundle 46, the image-receiving face 50 will pass by the image-emitting face 45a of the bundle 45 to transfer an image from the bundle 45 to the film 52. To continue further, immediately upon passing the image-emitting face 45a of the bundle 45, the face 50 of the cylinder 48 no longer becomes the image-receiving face of the cylinder 48. However, at this time, the face 51 of the cylinder 48 begins to pick up the image emitted from the fiber bundle 46 and to transfer said image to the film 52. This procedure is repeated continuously with the rotation of the cylinder 48 and images from the fiber bundles 46 and 45, in that order, are alternately and successively received in side-by-side relation with each other on the film 52, with no unexposed areas between the frames of the film.

With the systems of either Fig. 1 or Fig. 2 modified as shown in Fig. 3, two differently characterized images may be continuously projected onto a continuously moving motion-picture film successively and alternately as in stereo cinematography. Alternatively, multi-lens wide-angle pictures may be filmed on a continuously moving motion-picture film with the arrangement shown in Fig. 3 by projecting a portion of the wide-angle picture which is received from one objective lens through one of the fiber bundles 45 or 46 and simultaneously projecting another portion of the wide-angle picture which is received by another objective lens through the other of the fiber bundles 45 or 46.

It should be understood that any desired number of fiber bundles or equivalent image-projecting systems may be used to replace the fiber bundles 45 and 46 of Fig. 3 thereby permitting the projection of more than two different images alternately and successively onto a continuously moving motion-picture film or the like.

In Fig. 4, there is illustrated a still further modification of the invention which embodies a hollow cylinder 54 which is rotatable about its central axis and a stationary fiber optical image transfer bundle 55 extending across the space provided within the hollow interior of the cylinder 54.

The cylinder 54 is made up of a plurality of individual bundles 56 of light-conducting fibers each embodying a plurality of fibers which are fused, cemented or otherwise connected together in intimate side-by-side parallel relation with each other with the fibers at the opposite ends of the bundles having the same geometrical pattern. The bundles 56 which are of equal lengths are disposed radially about the axis of rotation of the cylinder 54 with their innermost face parts 57 in edge-to-edge relation with each other and with their central axes passing through the axis of rotation of the cylinder 54. Wedge-shaped filler members 58 of plastic or any other suitable material are placed between the fiber bundles 56 and cemented or otherwise secured to the fiber bundles 56 to rigidify the structure of the cylinder 54 and to retain said bundles in the above-mentioned aligned relation with each other. The inner faces 57 of the fiber bundles 56 are each formed to a radius of concave cylindrical curvature equal to ½ the distance from the axis of the cylinder 54 to its outer side surface and the outer faces 59 of the fiber bundles 56 are each formed to a radius of convex cylindrical curvature equal to the distance from the axis of the cylinder to its outer side surface. The stationary image transfer bundle 55 is formed of a plurality of light-conducting fibers bundled together in side-by-side connected parallel relation with each other with the fibers at its opposite ends or faces 60 and 61 being of the same geometrical pattern are provided with cylindrical curvatures concentric with the curvatures of the faces 57 of the bundles 56. The overall length of the image-transfer bundle 55 is such as to provide only a slight clearance between its ends and the faces 57 of the fiber bundles 56 so as to permit the hollow cylinder 54 to be freely rotated. In the system of Fig. 4, the film 53 is placed in direct contact with the outer cylindrical surface of the hollow cylinder 54 and is driven by sprockets 62 and 63 at a velocity equal to the velocity at which the outer cylindrical surface of the hollow cylinder 54 is caused to travel by rotation of the cylinder 54 about its central axis (the direction of travel of both the film and outer surface of the cylinder 54 being the same), whereby no slippage will occur between the film and the outer surface of the cylinder 54. It will be noted that due to the related radial distances between the axis of the cylinder 54 and its inner and outer wall surfaces, the inner wall surface will travel at a velocity of ½ that of the outer wall surface when the cylinder 54 is rotated.

In operation, an image 64 is directed by image-transfer means 64a into the fiber bundles 56 at the side of the cylinder 54 opposite to the film 53. The image-transfer means 64a is similar to the member 26 of Fig. 1 but is of a cross-sectional size substantially equal to that of each of the fiber bundles 56. The image 64 will then travel through the fiber bundles 56 and into the face 60 of the fiber transfer bundle 55 whereupon it will pass through the transfer bundle 55 and exit through the face 61 thereof into other fiber bundles 56 at the adjacent opposite side of the cylinder 54 and be transferred by the fiber bundles 56 directly to the film 53 which is in contact with the outer surface of the cylinder 54. It will be seen that upon first entering one of the fiber bundles 56, the image 64 will be set in motion or effectively travel across the fiber bundles in a direction indicated by arrow 65 opposite to the direction of rotation (see arrow 66) of the cylinder 54 and at the same velocity as that of the outer peripheral surface of the cylinder 54.

As the image exits through the inner side wall of the cylinder 54 which is traveling at ½ the velocity of the outer side surface thereof, the image motion will be reversed in the fibers of the transfer bundle 55 (see arrow 67) and reduced in velocity to ½ that of the outer surface of the cylinder 54. The image will then exit from the transfer bundle 55 through face 61 thereof with an upward motion (see arrow 68) equal in velocity to ½ that of the outer surface of the cylinder 54. With the face 57 of the fiber bundle 56 which is adjacent to the face 61 of the transfer bundle 55 traveling downwardly (see arrow 69) at an equal velocity, a cancelling out of the image motion will take place and the image will be effectively stationary while passing to the film through the bundle 56 which is in contact therewith. Thus, no relative motion between the film 53 and the image received thereby will take place and an accurately formed image will be produced on the film 53.

It is pointed out that the image frames produced on the film 53 by the device of Fig. 4 will be of a contour size and shape substantially equal to that of the individual faces 59 of the fiber bundles 56. Furthermore, the image frames on the film will be spaced from each other a distance equal to the spacing between the outer faces 59 of the fiber bundles 56.

Figure 5:
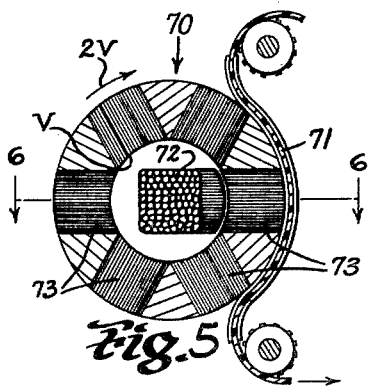
Fig. 5 is a diagrammatic longitudinal cross-sectional view of a further modification of the invention.
Figure 6:
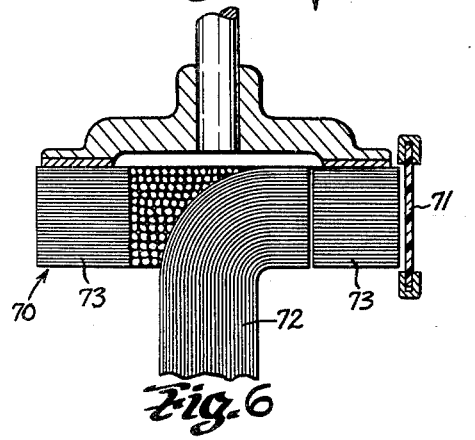
Fig. 6 is a transverse cross-sectional view taken substantially on line 6—6 of Fig. 5 looking in the direction of the arrows.

Figs. 5 and 6 show a modified form of the system of Fig. 4 wherein a hollow fiber optical cylinder 70 which is identical to the cylinder 54 of Fig. 4 is used. In the device of Figs. 5 and 6, however, the image which is ultimately exposed upon the film 71 is directed thereto from the hollow interior of the cylinder 70 through only one side thereof. An L-shaped fiber optical bundle such as 72 may be used for this purpose or any suitable optical system of lenses, prisms and/or mirrors. It being only necessary to pass the image-forming light substantially in the direction of the axis of the cylinder 70 to a point within its hollow interior wherein the light is turned at right angles to the axis of the cylinder 70 so as to strike the plane of the inner faces of the fiber bundles 73 at right angles thereto and pass into and through the fiber bundles 73 to the film 71 (see Fig. 6). In the device of Figs. 5 and 6, however, the film 71 must be slightly spaced from the cylinder 73 as by guide means or the like, such as shown in Fig. 1. This is necessary since the film 71 must be moved at ½ the velocity and in the same direction as the outer peripheral surface of the cylinder 70 to eliminate relative motion between the image-forming light incident upon the film and the film itself such as defined in connection with the device of Fig. 1.

Figure 7:
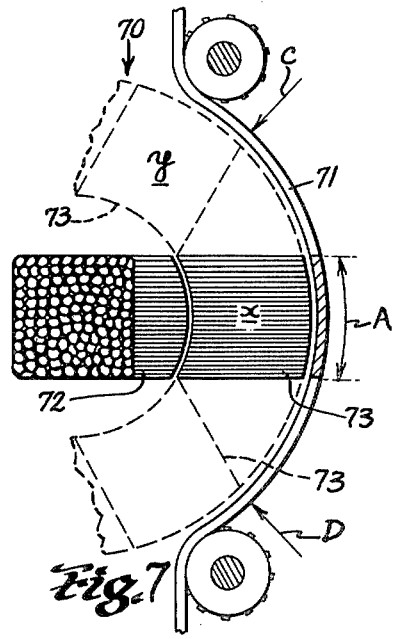
Figs. 7 and 8 are enlarged fragmentary schematic side views of the device of Figs. 5 and 6 which illustrate the operational characteristics of said device.
Figure 8:
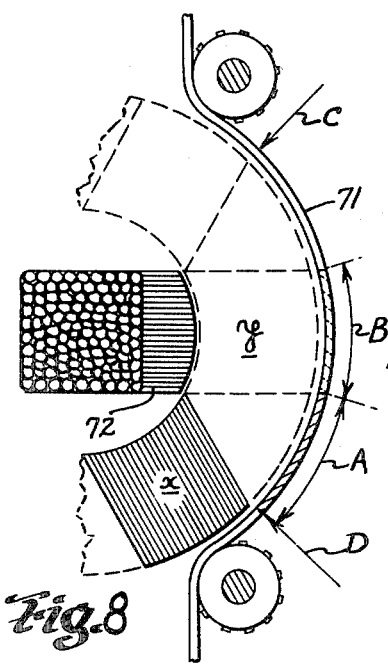
Figure 9:
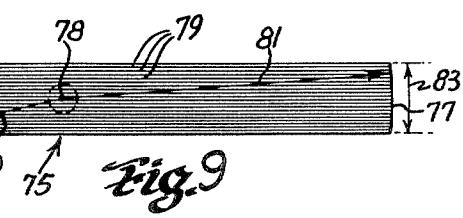
Fig. 9 is a still further modification of the invention.

Due to the fact that the inner faces of the fiber bundles 73 (Figs. 5 and 6) are in adjacent edge-to-edge relation with each other and further because of the fact that the outer peripheral side surface of the cylinder 70 is moved at a velocity of twice that of the film, the image frames produced upon the film will be in edge-to-edge relation with each other with no spacing therebetween. That is, the film will be continuously exposed to the image-forming light projected through the bundles 73. In order to illustrate this feature of the device of Fig. 5, reference is made to Figs. 7 and 8 wherein there is diagrammatically illustrated the forming of two successive picture image frames on the film 71. In Fig. 7, it can be seen that with the cylinder 70 in such a rotated position as to locate one of its fiber bundles 73 (which is labled x for purposes of identification) in axial alignment with the image-introducing means 72, the complete area A (shown in cross-section) of the film will be exposed to image-forming light and thus form a picture image frame on the film. At the time the next fiber bundle 73 (which is labeled y for purposes of identification) is moved into axial alignment with the image-introducing means 72, the film 71, which, as stated above, moves at ½ the velocity of the outer peripheral surface of the cylinder 70, will have moved the exposed area A to a location between the outer faces of the fiber bundles x and y (see Fig. 8) and a second frame B on the film 71 will be completely exposed to the image-forming light from the image-introducing means 72. It is pointed out that the areas or picture frames A and B will be in joining edge-to-edge relation with each other with no unexposed area therebetween. Continuous rotation of the cylinder 70 at a rate such as to cause the outer faces of the fiber bundles 73 to travel at a linear velocity of twice that of the film 71 will, therefore, cause successive picture-image frames to be formed in joining relation with each other on the film 71. While each picture-image frame formed on the film 71 has been described above as being fully exposed only when a fiber bundle 73 is axially aligned with the image-introducing means 72, it should be understood that different portions of each picture-image frame on the film 71 are exposed between the points C and D so that only when the picture frame A, for example, reaches the position shown in Fig. 8 has it been completely and evenly exposed throughout its entire area. Again considering the area or frame A of the film 71, the top of said area will begin to be exposed at the location indicated by C and the exposure of the area or frame A will progress from said top downwardly to the bottom thereof where the complete picture area or frame A as received from bundle x as shown in Fig. 7 is exposed. At this position, however, the upper portion only of the area or frame A has been completely exposed. This progressive exposure of the frame A is caused by the relative downward movement of the adjacent parts of the film and cylinder 70. Continued travel of the film 71 to the position shown in Fig. 8 will cause the area or frame A to gradually move downwardly wherein the exposure of the lower portion of said area or frame A will be completed and move out of exposure when the lower edge of said area or frame A reaches the point D. Picture frame A has now been completely and evenly exposed throughout its entire area to image-forming light from the image-introducing means 72.

It is again pointed out that while the outer faces of the fiber bundles 73 travel at a velocity of about twice that of the film 71, the inner faces of said fiber bundles 73 are in edge-to-edge joining relation with each other and travel at a velocity equal to that of the film 71 so that no relative motion takes place between the film and the resultant picture image itself which is finally received at the plane of said film 71.

While thus far, the various forms of the invention have embodied cylindrically shaped fiber optical members consisting of one or more fiber bundles rotatable about the central axis of the cylinder, it should be understood that, for special purposes, a fiber optical bundle may be rotated or oscillated eccentrically about an axis which is closer to one of its faces than the other thereof as shown diagrammatically in Fig. 6.

In Fig. 6, the fiber bundle 75 is provided with optically finished cylindrically curved end faces 76 and 77 which are each concentric with an axis 78 passing through the bundle 75 in a direction normal to the direction of the fibers 79 which make up the bundle 75. The bundle 75 is made up of a plurality of light-conducting fibers similar to those of the devices of Figs. 1–5 which are cemented, fused or otherwise connected together in intimate side-by-side parallel relation with each other. The axis 78 about which the bundle 75 is oscillated is located closer to the face 76 than it is to the face 77 and the face 76 is provided with a radius of cylindrical curvature 80 equal to its distance from the axis 78. In a similar fashion, the face 77 of the bundle 75 is provided with a cylindrical curvature of a radius 81 equal to the distance between the outer surface of said face 77 and the axis 78. Rotation or oscillation of the bundle 75 about axis 78 will then cause each of the face parts 76 and 77 to move concentrically about the axis 78 at their respective radial distances from the axis 78. By projecting an image, as indicated by the arrow 82 into the bundle 75 through its face 76 and simultaneously rotating or oscillating the bundle about axis 78, it will be seen that motion will be imparted to the image traveling through the fibers 79 which is equal in velocity to the velocity at which the face 76 moves past the image 82. However, the image will exit from the bundle 75 through its face 77 (as indicated by arrow 83) at a velocity equal to its rate of travel in the fibers plus the velocity at which the face 77 is traveling. The differences in velocities or rates of travel of the faces 76 and 77 will be proportionate to the differences between the respective radial distances 80 and 81 at which said faces are located from the axis 78. It is to be understood that either end of the bundle 75 may be used to receive images and if the image is projected into the face 77, a reverse condition to that just described will take place.

It should be clear that the device of Fig. 6 will provide simple and efficient means for transferring images from one location to another while simultaneously introducing motion to said images in a manner similar to that of the various arrangements illustrated by Figs. 1–5.

From the foregoing, it can be seen that simple, efficient and economical means has been provided for accomplishing all of the objects and advantages of the invention. Nevertheless, it is apparent that many changes in the details of construction, and arrangement of parts may be made without departing from the spirit of the invention as expressed in the accompanying claims and the invention is not limited to the exact matters shown and described as only the preferred matters have been given by way of illustration.

Having described my invention, I claim:

1. A device of the character described comprising an assembly of a plurality of elongated light-conducting fibers in connected side-by-side parallel relation with each other, a cylindrically curved optically finished face part at each end of said assembly, the curvatures of said face parts being in concentric relation with each other, means for supporting said assembly in such manner so as to cause said face parts thereof to be movable arcuately about an axis disposed in normal relation to the direction of the longitudinal axes of said fibers and passing through the centers of curvatures of said face parts and means for imparting said movement to said assembly.

2. A device of the character described comprising a cylinder rotatable about its axis, the major portion of said cylinder embodying an assembly of a plurality of elongated light-conducting fibers in connected side-by-side parallel relation with each other, said fibers extending in a direction substantially normal to its axis, means for supporting said cylinder so as to be rotatable about its axis, the opposite ends of said assembly of fibers being optically finished and means for rotating said assembly at a predetermined rate.

3. A device of the character described comprising a pair of cylinders of predetermined equal outside diameters each of which is rotatable about its respective axis, the major portion of each of said cylinders embodying a bundle of a plurality of light-conducting fibers in intimately grouped side-by-side parallel relation with each other, said fibers extending substantially normal to the axes of said cylinders, said bundles each having their opposite ends optically finished to cylindrical curvatures which are concentric with the longitudinal axes of said respective cylinders, means for rotatably supporting said cylinders in spaced relation with each other with their longitudinal axes in substantially parallel relation with each other, light transfer means in said space between said cylinders for receiving light which is passed through one of said cylinders and for directing said light into the other of said cylinders and means for rotating said cylinders.

4. A device of the character described comprising a cylinder rotatable about its longitudinal axis and of a predetermined outside diameter, the major portion of said cylinder embodying a bundle of a plurality of light-conducting fibers in intimately grouped side-by-side parallel relation with each other and extending in a direction normal to the axis of said cylinder, said bundle having each of its ends optically cylindrically finished to a curvature concentric with the axis of said cylinder and of a radius of curvature equal to one-half of said outside diameter of said cylinder, means for supporting said cylinder for rotation about its axis and means for rotating said cylinder at a predetermined rate.

5. A device of the character described comprising an assembly of a plurality of light-conducting fibers in connected side-by-side parallel relation with each other, means for supporting said assembly so as to be rotatable about an axis normal to and in intersecting relation with an axis extending centrally and longitudinally through said assembly, the opposite ends of said assembly being provided with optically finished convex cylindrically curved surfaces which are concentric with said axis of rotation of said assembly and means for imparting motion to said assembly at a predetermined rate about its axis whereby stationary optical images projected into one end of said assembly will be transferred to its opposite end and will effectively be set in motion while traveling through said assembly.

6. A device of the character described comprising a hollow cylinder rotatable about its axis, said cylinder embodying a plurality of bundles of light-conducting fibers, the fibers of each of said bundles being in intimate side-by-side parallel relation with each other and the bundles being so disposed as to cause a central axis through each of said bundles to intersect said axis of said cylinder, an optically finished cylindrically curved face part at each end of said bundles having their centers of curvatures lying on said axis of said cylinder, said face parts at the ends of said bundles which are closest to said axis of said cylinder being in edge-to-edge relation with each other and equally radially spaced from said axis of said cylinder and said bundles being of equal lengths between their respective opposite face parts.

7. In combination, a cylinder of a predetermined outside diameter rotatable about its axis, the major portion of said cylinder embodying a bundle of a plurality of light-conducting fibers in intimately grouped side-by-side relation with each other and extending transversely across said cylinder in a direction normal to its axis, said bundle having its ends optically cylindrically finished to a curvature concentric with the longitudinal axis of said cylinder and of a radius of curvature equal to one-half of the outside diameter of said cylinder, means for supporting said cylinder for rotation about its axis, means for rotating said cylinder to impart a predetermined rate of movement to its outer side surface, a film member, means for supporting and moving said film member past one side of said cylinder at a predetermined rate, means for projecting image-forming light onto the side of said cylinder opposite the film member, whereby rotation of said cylinder about its axis simultaneously with movement of said film member at a velocity of twice that of the outer side surface of said cylinder will cause said image-forming light entering said bundle of light-conducting fibers to be conducted through said fibers to said film member with substantially no relative motion taking place between said film member and the image-forming light which impinges upon said film during the time of exposure of said film to said image-forming light.

8. In combination, a pair of cylinders of predetermined equal outside diameters each rotatable about its respective axis, the major portion of each of said cylinders embodying a bundle of a plurality of light-conducting fibers in intimately grouped side-by-side parallel relation with each other, said fibers extending transversely across said respective cylinders in a direction normal to their longitudinal axes, each of said bundles having its opposite ends optically finished to a cylindrical curvature concentric with the axis of its respective cylinder and of a radius of curvature of one-half the outside diameter of said cylinder, means for rotatably supporting said cylinders in spaced relation with each other, light transfer means in said space between said cylinders for receiving light which is passed through one of said cylinders and for directing said light into the other of said cylinders, means for simultaneously rotating said cylinders at predetermined rates and in opposite directions to each other, means for projecting image-forming light into a side of one of said cylinders opposite to said light transfer means and film guide and drive means for directing a film over the side of the other of said cylinders opposite said light transfer means, whereby rotation of said cylinder into which said image-forming light is projected at one-half the velocity of rotation of the other of said cylinders over which said film is directed and with said film moving at a velocity equal to that of the adjacent side of said other cylinder will cause said image-forming light passing through said cylinders and light transfer means to impinge upon said film with substantially no relative motion taking place between said impinging image-forming light and film during the time of exposure of said film to said light.

9. In combination, a hollow cylinder rotatable about its axis, the wall of said cylinder embodying a plurality of bundles of light-conducting fibers, the fibers of each of said bundles being in intimate side-by-side parallel relation with each other and the bundles being disposed in said wall in such manner as to cause a central axis through each of said bundles to intersect said axis of said cylinder, an optically finished cylindrically curved face part at each end of said bundles having their centers of curvatures lying on said axis of said cylinder, said face parts at the ends of said bundles which are closest to said axis of said cylinder being in substantially edge-to-edge relation with each other and equally radially spaced from said axis of said cylinder, fixed image transfer means extending in a direction transversely of the hollow interior of said cylinder with its opposite ends cylindrically shaped concentrically with the adjacent face parts of said bundles of light-conducting fibers and in close adjacent relation with said fiber bundles, means for projecting image-forming light into the outer side of said cylinder at a location oppositely aligned with an end of said image transfer means and film guide and drive means for directing a film over and in contact with the opposite side of said cylinder whereby said image-forming light will pass through one side of said cylinder, into and through said image transfer means and through the opposite side of said cylinder to become incident upon said film wherein rotation of said cylinder and simultaneous movement of said film at rates such as to cause said film and outer surface of said cylinder to move at equal velocities and in the same direction will cause said images to move with said film and at the same velocity as said film during the time of exposure of said film to said image-forming light.

10. In combination, a hollow cylinder rotatable about its longitudinal axis, the wall of said cylinder embodying a plurality of bundles of light-conducting fibers, the fibers of each of said bundles being in intimate side-by-side parallel relation with each other and the bundles being disposed in said wall in such manner as to cause a central axis through each of said bundles to intersect said axis of said cylinder at substantially right angles thereto, an inner concave and an outer convex optically finished cylindrically curved face part on each of said bundles, said face parts having their centers of curvatures lying on said axis of said cylinder, said inner concave face parts of said bundles being disposed in adjacent substantially edge-to-edge relation with each other and each equally radially spaced from said axis of said cylinder, fixed image transfer means extending into the hollow interior of said cylinder and having one of its ends cylindrically convexly shaped to a curvature concentric with the inner face parts of said bundles of light-conducting fibers and disposed in close adjacent relation with said inner face parts of said fiber bundles, means for projecting image-forming light into the opposite end of said image transfer means to cause said light to pass through the same and exit therefrom into said bundles of fibers, and film guide and drive means for causing a film to pass the side of said cylinder opposite to said cylindrically-shaped end of said fixed image transfer means whereby said image-forming light will pass from said fixed image transfer means into and through said fiber bundles which are adjacent thereto to become incident upon said film and said rotation of said cylinder, along with movement of said film at a velocity equal to one-half that of the outer adjacent surface of said cylinder, and in the same direction, will cause images formed by said image-forming light and incident upon said film to move in the direction of said film and at the same velocity as said film.

No references cited.